United States Patent
Singh et al.

(10) Patent No.: US 11,145,171 B2
(45) Date of Patent: Oct. 12, 2021

(54) ELECTRONIC DOORBELL SYSTEM WITH TEXT COMMUNICATION

(71) Applicant: Arlo Technologies, Inc., Carlsbad, CA (US)

(72) Inventors: Rajinder Singh, San Jose, CA (US); Justin Maggard, Fremont, CA (US); Dnyanesh Patil, Fremont, CA (US); Dennis Aldover, Carlsbad, CA (US); Nisheeth Gupta, Mountain View, CA (US); Subramanian Ramamoorthy, San Jose, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 90 days.

(21) Appl. No.: 16/289,302

(22) Filed: Feb. 28, 2019

(65) Prior Publication Data

US 2020/0279459 A1 Sep. 3, 2020

(51) Int. Cl.
| | |
|---|---|
| *G08B 3/10* | (2006.01) |
| *G06F 40/58* | (2020.01) |
| *G10L 13/00* | (2006.01) |
| *G10L 15/00* | (2013.01) |
| *G10L 15/16* | (2006.01) |
| *G10L 15/22* | (2006.01) |
| *H04N 7/18* | (2006.01) |
| *H04W 4/12* | (2009.01) |

(52) U.S. Cl.
CPC ........... *G08B 3/1066* (2013.01); *G06F 40/58* (2020.01); *G10L 13/00* (2013.01); *G10L 15/005* (2013.01); *G10L 15/16* (2013.01); *G10L 15/22* (2013.01); *H04N 7/186* (2013.01); *H04W 4/12* (2013.01)

(58) Field of Classification Search
CPC .. G08B 3/10; G08B 3/1066; G08B 13/19684; G06F 40/58; H04M 11/025
USPC ........................................................ 704/232
See application file for complete search history.

(56) References Cited

U.S. PATENT DOCUMENTS

| | | | |
|---|---|---|---|
| 7,194,412 B2 | 3/2007 | Mays | |
| 7,746,986 B2 | 6/2010 | Bucchieri et al. | |
| 7,999,857 B2 | 8/2011 | Bunn et al. | |
| 8,682,034 B2 | 3/2014 | Garoutte | |
| 9,257,115 B2* | 2/2016 | Waibel | G06F 40/174 |
| 9,324,322 B1 | 4/2016 | Torok et al. | |
| 9,838,791 B2* | 12/2017 | Wargon | G08B 1/08 |

(Continued)

*Primary Examiner* — Susan I McFadden
(74) *Attorney, Agent, or Firm* — Boyle Fredrickson S.C.

(57) ABSTRACT

An electronic doorbell system can be configured to enable remote audio communications between a visitor at the doorbell and a user of a mobile computing device by exchanging speech-to-text and/or text-to-speech messages in real time. Audio captured by the visitor can be transcribed into text messages and sent to the user of the mobile device using a speech-to-text service. The user of the mobile device can send text messages to the doorbell for playback to the visitor by using a text-to-speech service. The system can also use artificial intelligence to detect the language spoken by the visitor for translating between a predetermined language of the user and the language of the visitor. The system can also include a camera for capturing video of the visitor for display to the mobile device simultaneous with exchanging text messages between the visitor and the user, such as during a live Session Initiation Protocol (SIP) communication.

14 Claims, 8 Drawing Sheets

(56) References Cited

U.S. PATENT DOCUMENTS

| | | | |
|---|---|---|---|
| 9,922,647 B2* | 3/2018 | Kurata | G10L 15/28 |
| 10,601,604 B2* | 3/2020 | Kozura | H04L 12/2816 |
| 10,664,688 B2* | 5/2020 | Goulden | G06K 9/00288 |
| 10,708,472 B2* | 7/2020 | Jeong | H05K 1/144 |
| 10,803,719 B1* | 10/2020 | Skeoch | H04N 5/23241 |
| 2007/0008078 A1 | 1/2007 | Sau | |
| 2008/0215334 A1 | 9/2008 | Gandhi et al. | |
| 2012/0109632 A1 | 5/2012 | Sugiura et al. | |
| 2016/0240007 A1 | 8/2016 | Weerasinghe | |
| 2016/0330413 A1 | 11/2016 | Scalisi et al. | |
| 2017/0220872 A1 | 8/2017 | Child et al. | |
| 2017/0238097 A1 | 8/2017 | Wargon | |

* cited by examiner

ELECTRONIC DOORBELL SYSTEM WITH TEXT COMMUNICATION

BACKGROUND OF THE INVENTION

1. Field of the Invention

The present invention relates to an electronic monitoring system, and more particularly, to an electronic doorbell system being configured to communicate with a user.

2. Discussion of the Related Art

A doorbell is a signaling device typically placed near a door to a building's entrance. When a visitor presses a button, the bell rings or otherwise generates a human discernable signal inside the building, alerting the occupant to the presence of the visitor. Although the first doorbells were mechanical, activated by pulling a cord, modern doorbells are generally electric switches; and the most recent versions may contain miniature cameras, may be connected to the Internet, and may even incorporate facial recognition technology. These doorbells permit a user to monitor doorbell activation remotely via an application user-accessible device such as a computer or smartphone.

However, modern doorbells continue to suffer from several drawbacks. For example, although such doorbells can initiate contact with a remote user, the user might not find it convenient to actually speak to the visitor at the particular time of contact. Also, if the visitor is speaking a different language than what the user is accustomed to, the user might not be able to communicate with the visitor at all. A need therefore exists for an improved doorbell system which eliminates one or more of the foregoing disadvantages.

SUMMARY OF THE INVENTION

An electronic doorbell system can be configured to enable remote audio communications between a visitor at the doorbell and a user of a mobile computing device by exchanging speech-to-text and/or text-to-speech messages in real time. Audio captured by the visitor can be transcribed into text messages and sent to the user of the mobile device using a speech-to-text service. The user of the mobile device can send text messages to the doorbell for playback to the visitor by using a text-to-speech service. The system can also use artificial intelligence to detect the language spoken by the visitor for translating between a predetermined language of the user and the language of the visitor. The system can also include a camera for capturing video of the visitor for display to the mobile device simultaneous with exchanging text messages between the visitor and the user, such as during a live Session Initiation Protocol (SIP) communication, Web Real Time Communication (WebRTC) or any other form of Real Time Communication between the doorbell and the mobile device.

Specifically then, one aspect of the present invention can provide an electronic doorbell system, including: an electronic doorbell configured to capture an audio stream; a hub in communication with the electronic doorbell, the hub having a processor executing a program stored in a non-transient medium operable to: detect a trigger event from the electronic doorbell; after the trigger event, receive an audio stream captured by the electronic doorbell; and in response to the audio stream, produce a text message corresponding to the audio stream at an electronic device. Additionally, the hub can provide the audio stream to a language-translation service to produce a translated audio stream, such as from English to Spanish, and then direct the translated audio stream to the electronic device.

Another aspect of the present invention can provide a method for electronic monitoring, including: configuring an electronic doorbell to capture an audio stream; detecting a trigger event from the electronic doorbell; after the trigger event, receiving an audio stream captured by the electronic doorbell; and in response to the audio stream, producing a text message corresponding to the audio stream at an electronic device.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
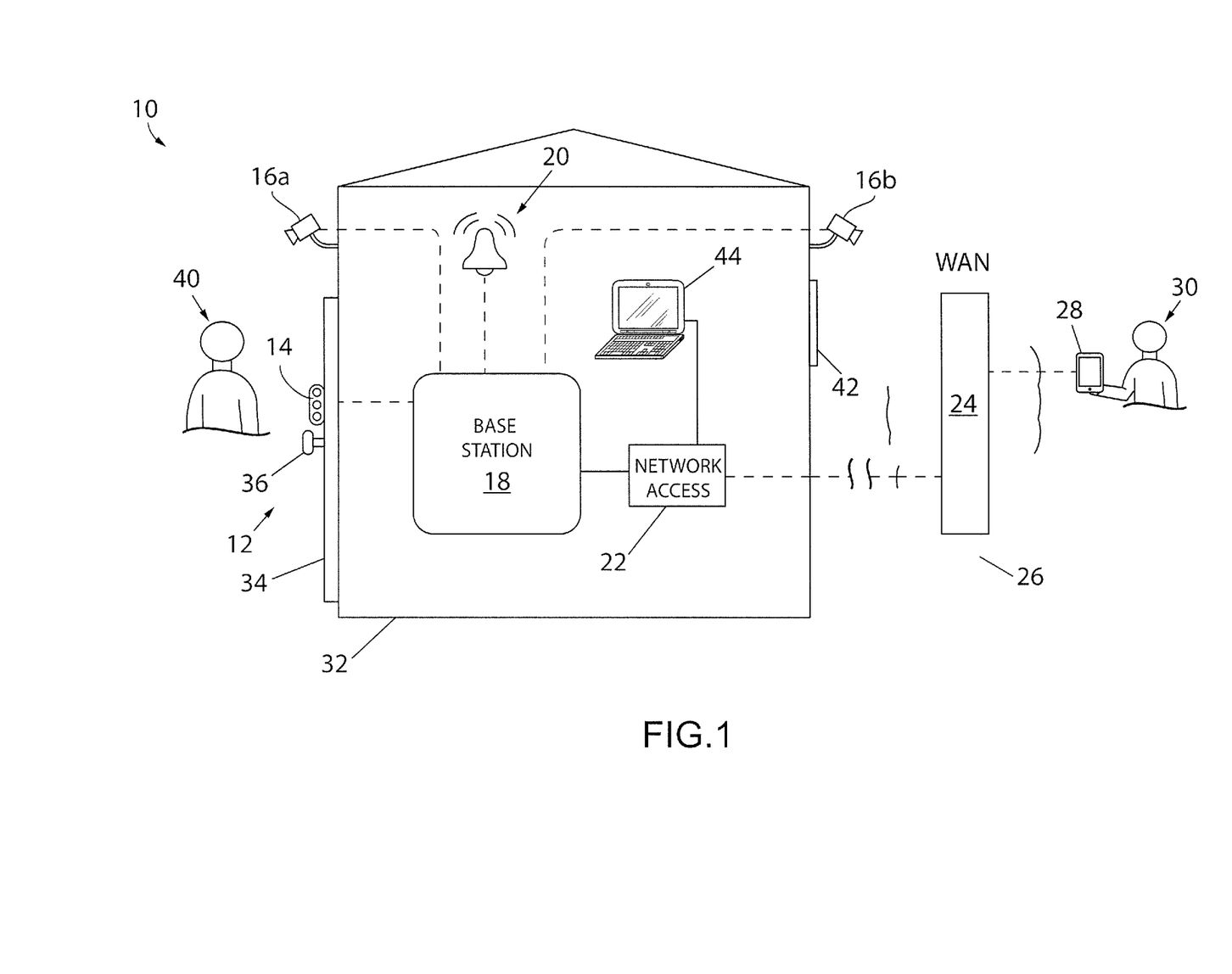
FIG. 1 is a diagram of a system for electronic monitoring which uses an electronic doorbell and base station in accordance with an aspect of the invention.

Referring now to FIG. 1, a diagram illustrating a system 10 for electronic monitoring is provided in accordance with an aspect of the invention. The system 10 can comprise an electronic doorbell system 12, including an electronic doorbell 14, one or more cameras 16, such as first and second cameras 16a and 16b, respectively, a hub or base station 18 and/or a chime 20. The base station 18 can communicate with the doorbell 14, the cameras 16 and/or the chime 20 through a wireless local network, such as an IEEE 802.11 wireless Local Area Network (LAN). The base station 18, in turn, can connect to network access equipment 22, such as modem and/or router, for communicating with a backend system 24 through a Wide Area Network (WAN) 26 such as the Internet. The backend system 24, which could comprise one or more servers, in turn, can communicate with an electronic device 28, such a smart phone, tablet computer, or laptop or desktop computer operated by a user 30.

The doorbell system 12 can be arranged with respect to a building 32, such as a home or office building. For example, the doorbell 14 can be arranged proximal to a door 34 of the building 32, in a traditional location customarily found by visitors, such as against an exterior wall or doorframe of the building 32 adjacent to the door 34 at a height just above a door knob 36. Each camera 16 can also be arranged with respect to a building 32, but advantageously at separate locations from the doorbell 14 to provide optimum viewing angles of visitor(s). For example, a first camera 16a can be arranged against the exterior wall of the building 32, several feet above the door 34, to provide an optimum angle for viewing a visitor 40 standing in front of the door. Also, a second camera 16b can be arranged against a different area of the building 32, such as several feet above a side or back window 42, distal from the first camera 16a, to provide an optimum angle for viewing any person proximal to such alternative access point. "Distal" refers to a physical separation between devices such that views and/or sounds captured by the devices far enough away from one another such that the devices are operable provide distinctly different points of observation that are useful to the user 30. As yet another example, a camera (not shown) could be mounted on a post or tree located several feet away from the building with a view of the door 34.

In addition, in one aspect, a computer 44 can be connected directly to the system, such as through the network access equipment 22, for allowing a user in the building 32 direct access to the system 12. The computer 44 could, for example, comprise a tablet, laptop, or desktop computer. This can serve as a back-up to the device 28 when the user 30 is in the building 32 for communicating over the VoIP telephone call with the visitor 40 as described herein.

A visitor 40 approaching the door 34 can cause a trigger event. Such trigger events could comprise, for example: the visitor 40 pressing or otherwise actuating a button on the doorbell 14; motion of the visitor 40 being detected by a motion sensor of the doorbell 14 and/or in a floodlight, a camera, or other device located in the vicinity of the doorbell and in communication with the base station 18; and/or a sound of the visitor 40 being detected by a microphone of the doorbell 14. Following occurrence of the trigger event, the system 12 is configured to immediately call the user 30 at a predetermined location, such as the device 28. In the most typical case in which the call is an audio form, possibly accompanied by video data, enabled by the base station 18 making a Voice over Internet Protocol (VoIP) call to the device 28. The system 12 reduces latency by omitting push notifications to the device 28, which otherwise would require the user 30 to open an application program on the device 28 before making any calls, and instead proceeds to immediately call the user's device. The remainder of the specific example contained herein assumes such a telephone call.

In one aspect, an audio stream captured by a microphone of the doorbell 14, and a video stream captured by a camera 16, such as the first camera 16a, can be synchronized by the base station 18 to communicate a synchronized media stream in near real time to the device 28. "Near real time" refers to the time delay introduced, by automated data processing and/or network transmission, between the occurrence of an event and the use of the processed data, such as for display or feedback and control purposes. For example, a near real time display depicts an event or situation as it existed at the current time minus the processing time, as nearly the time of the live event. Also, an audio stream captured by a microphone of the device 28 can be returned to the base station 18 to communicate to the doorbell 14 to allow a near real time VoIP conversation between the user 30 and the visitor 40 during a call.

Figure 2:
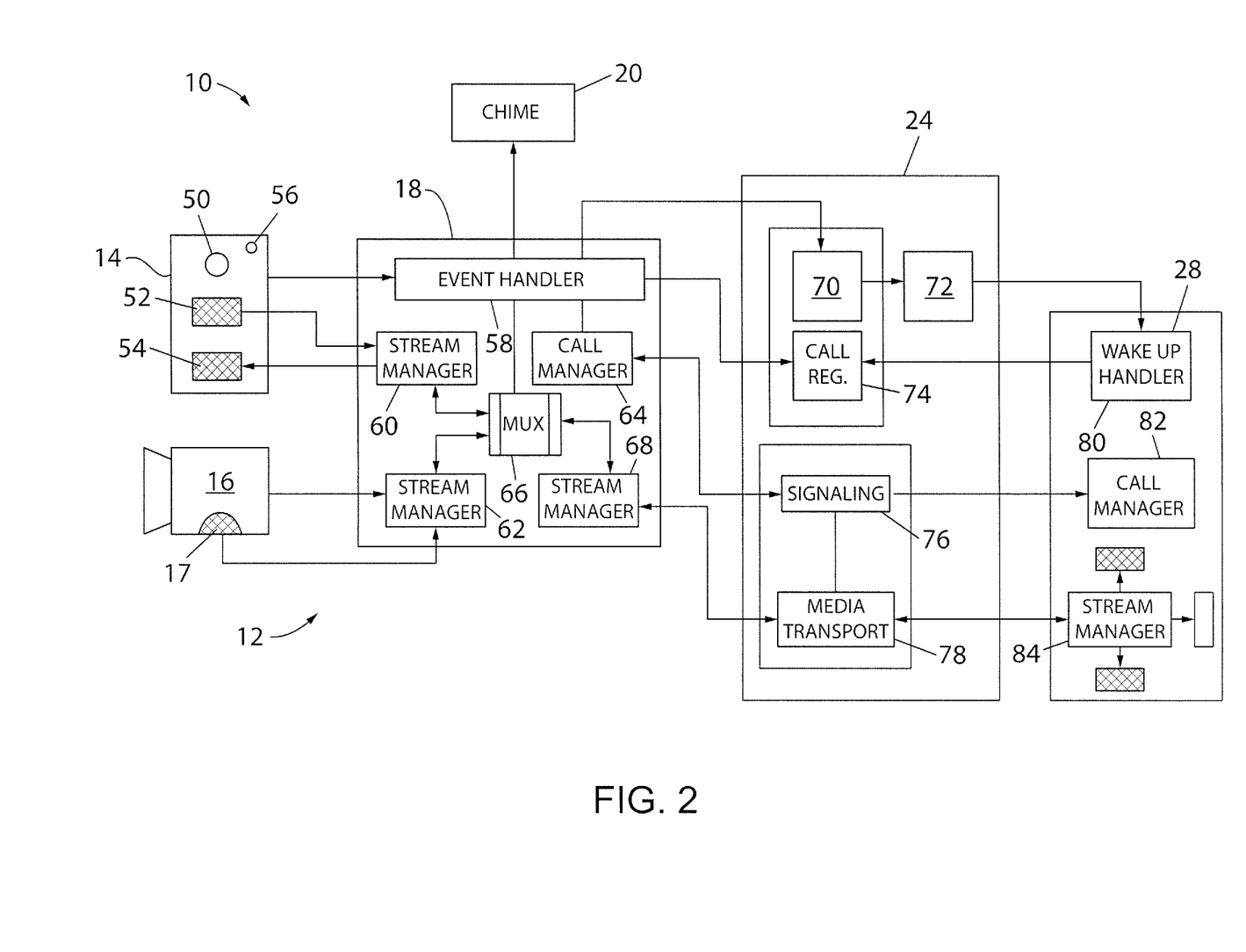
FIG. 2 is a diagram illustrating communication in the system of FIG. 1.

Referring now to FIG. 2, a diagram illustrating communication in the system 10 is provided in accordance with an aspect of the invention. The doorbell 14 can include a button 50, a microphone 52, a speaker 54 and/or a motion sensor 56. As mentioned, some of these functionalities could be provided on or duplicated on devices located apart from the doorbell. The doorbell 14 can also include processing and circuitry contained in a doorbell housing configured to be arranged proximal to the door 34. The button 50 can be a doorbell button or switch that is sensed by the base station 18 when actuated by the visitor 40. The microphone 52 can be configured to capture an incoming audio stream for communication in the system and for detection of sound (such as the voice of visitor 40). The speaker 54 can be configured to play an outgoing audio stream for communication to the visitor 40. The motion sensor 56 could be an active or passive Infrared (IR) motion sensor for detection of motion (such as by the visitor 40).

The camera 16 can include a lens, a microphone, a speaker and/or a motion sensor. The camera 16 can also include processing and circuitry contained in a camera housing configured to be arranged in diverse locations, such as against an exterior wall of the building 32 or even apart from but facing the building. The camera 16 can be configured to capture a video stream for communication in the system. The camera 16 can also be configured for detection of motion (such as from the visitor 40).

Figure 3:
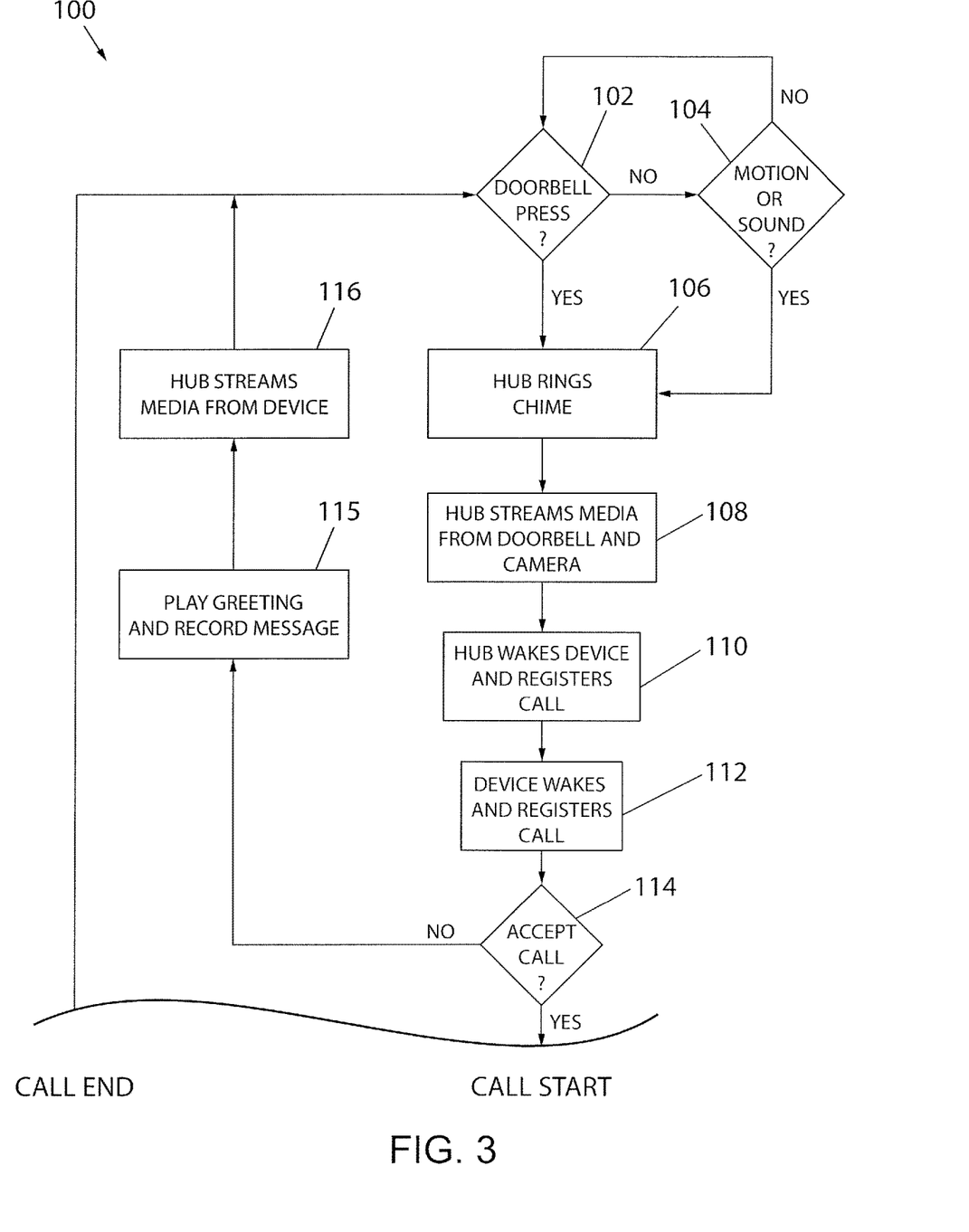
FIG. 3 is a flow chart illustrating operation for an electronic device receiving a call in the system of FIG. 1.

With additional reference to a process 100 of FIG. 3 and continued reference to the system schematic of FIG. 2, an operation for a VoIP telephone call to the device 28, triggered by the system 12, is provided in accordance with an aspect of the invention. Beginning at decision steps 102 and 104, the system 12 can monitor for a trigger event near the doorbell continuously in a loop. For example, at decision step 102, the base station 18 can monitor the button 50 of the doorbell 14 for actuation by a visitor 40. If the button 50 is not actuated or pressed ("No"), the base station 18 can proceed to decision step 104 to monitor for another triggering event such as the detection of motion and/or sound near the doorbell, such as motion detected by the motion sensor 56, sound detected by the microphone 52, and/or motion or sound detected by the camera 16. If another trigger event is not detected ("No"), the base station 18 can return to decision step 102 in a loop. However, if the button 50 is actuated or pressed at decision step 102 ("Yes"), and/or if another trigger event such as motion and/or sound is detected at decision step 104 ("Yes"), the process 100 can break the monitoring loop and proceed to step 106. Such trigger events can be detected by an event handler 58 of the base station 18.

Next, in response to the trigger event, the system 12 can proceed to take any or all of several actions near simultaneously. At step 106, the base station 18 can control the chime 20 to ring in the building 32, causing an audible alarm to alert occupants of the building 32 of the presence by the visitor 40. At step 108, the base station 18 can stream audio captured by the doorbell 14 and video captured by the camera 16 (it being understood that the camera may be any of several cameras 16a, 16b, etc. that are active at that time). In particular, an audio stream manager 60 of the base station 18 can capture the audio stream from the doorbell 14, and a video stream manager 62 of the base station 18 can capture the video stream from the camera 16, along with an audio stream from a microphone 17 of the camera 16, if the camera 16 is so equipped. A multiplexor 66 of the base station 18 can synchronize the audio stream from the audio stream manager 60 with the video stream from the video stream manager 62 for later communicating a synchronized media stream to the device 28 after communication has been established.

At step 110, the base station 18 can proceed to wake the device 28 for the call. In the case of the call being a telephone call, the base station 18 can register itself for the VoIP call, through the backend system 24. In particular, the base station 18 can wake the device 28 for the telephone call by the event handler 58 contacting a system events service 70 of the backend system 24. The event handler 58 can request, through the system events service 70, an endpoint for making the call. The system events service 70, in turn, can send a wake-up notification to a notify service 72. The notify service 72, in turn, can send the wake-up notification to a wake-up handler 80 executing on the device 28. Also, the base station 18 can register for the call through the backend system 24 by the event handler 58 contacting a call registration service 74.

At step 112, the device 28 can wake via the wake-up handler 80. Also, the device 28 can register to receive the VoIP call through the backend system 24. With the call registered at each endpoint, a call manager 64 of the base station 18 can send a call invite to the device 28 through a signaling service 76. The signaling service 76 can provide Session Initiation Protocol (SIP) signaling for initiating, maintaining, and terminating real-time sessions that include voice, video and messaging applications between the system 12 and the device 28. A call manager 82 of the device 28, in turn, can receive the invitation. This can appear to the user 30 as the device 28 spontaneously waking and ringing with an immediate incoming phone call with a caller identification (Caller ID) indicating the system 12 as being the caller.

At decision step 114, the user 30 can choose to accept or decline the call, such as by tapping an appropriate selection on a touchscreen of the device 28, like other incoming phone calls. If the user chooses to decline the call ("No"), the process 100 can proceed to step 115 in which the base station 18, being operable to detect a failure of the electronic device to answer the call, controls the doorbell 14 to play a predetermined greeting and record a voice message with a defined start and stop from the visitor 40 in response to the greeting. For example, the doorbell 14 may relay "I cannot come to the door right now." The voice message, in turn, can be sent by the base station 18 to device 28. In other words, if at decision step 114 the user declines the call ("No"), then a SIP call is not initiated between the doorbell 14 (through the base station 18) and the device 28. Instead, a prerecorded audio message can be played at the doorbell 14, such as: "We are not able to come to the door right now. Please leave a message."

In addition, in the process 100, at step 116, a loaded application program executing on the device 28 can receive the synchronized media stream to the device 28. In particular, a hub stream manager 68 of the base station 18 can send the synchronized media stream from the multiplexor 66 ("mux") to a media transport tunneling service 78 of the backend system 24. The media transport tunneling service 78 can provide Real Time Streaming Protocol (RTSP) signaling to control the media stream as Real-time Transport Protocol (RTP) packets between the base station 18 and the device 28. An application stream manager 84 of the device 28, executing as part of the application program, can receive the media stream. The user 30 can open the application program on the device 28 to see and hear the media stream in real time through the application program. Alternatively, the user 30 can place the device 28 back into sleep with the possibility of returning to the application program later for viewing the media stream as a recorded event.

Figure 4:
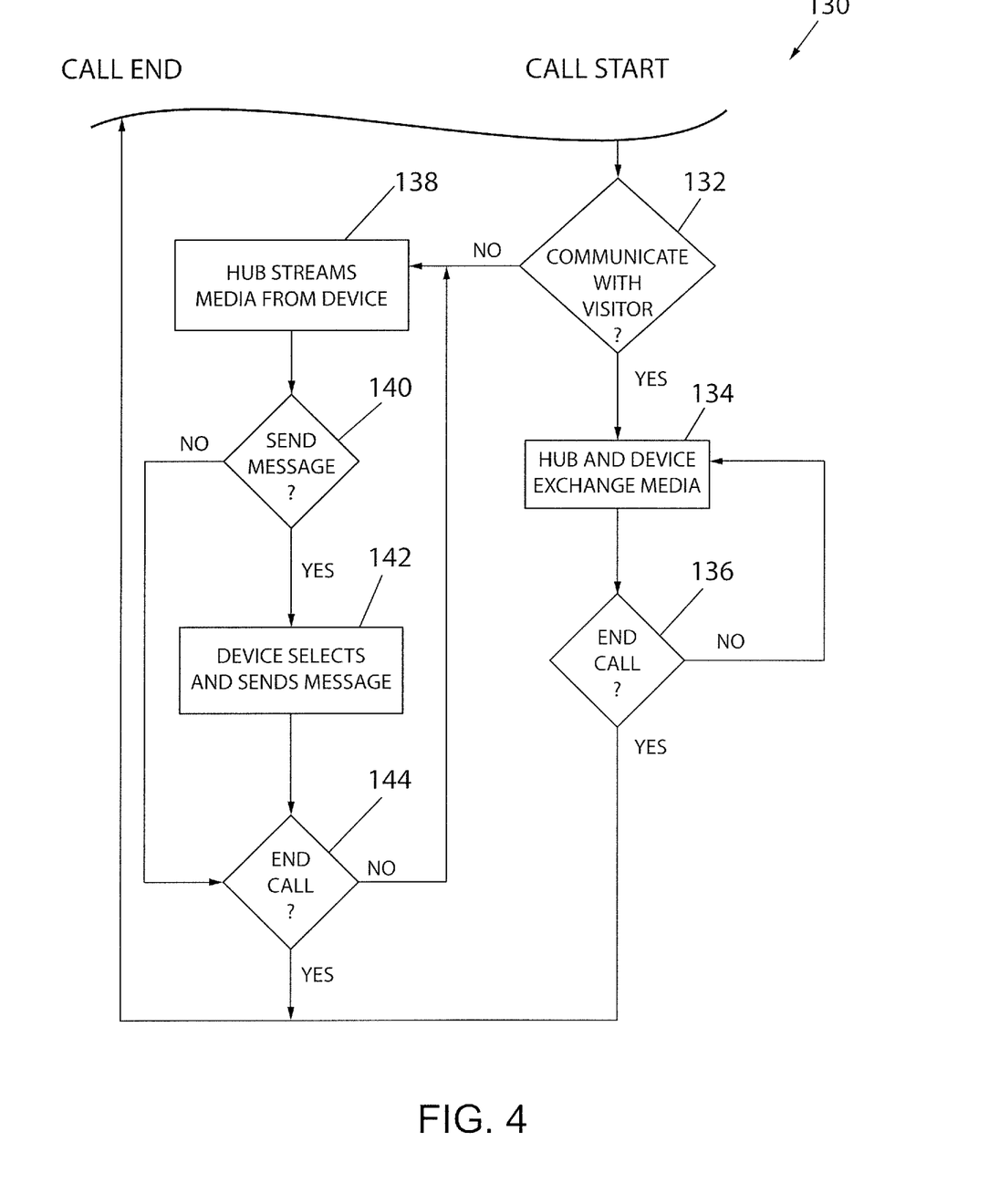
FIG. 4 is a flow chart illustrating operation for an electronic device communicating with the doorbell during a call in the system of FIG. 1.

However, returning to decision step 114, and with additional reference to FIG. 4, if the user chooses to accept the call ("Yes"), the process 100 can proceed to a telephone call routine ("Call Start") at process 130. In other words, if at decision step 114 the user accepts the call ("Yes"), then a SIP call is initiated between the doorbell 14 (through the base station 18) and the device 28. By default, the microphone of the device 28 can be muted. At decision step 132, after accepting the call, the user 30 can choose whether to communicate directly or indirectly with the visitor 40, such as by tapping another selection on the touchscreen of the device 28. If the user chooses to communicate directly with the visitor ("Yes"), such as for a more traditional phone call, the process 130 can proceed to step 134 in which the microphone of the device 28 is unmuted, and the base station 18 and the device 28 exchange bi-directional media streams in a VoIP call that is near real time. In one aspect, the exchange of bi-directional media streams can comprise outgoing video and audio streams from the system 12 (and the doorbell 18) to the device 28, and only an incoming audio stream from the device 28 to the system 12. However, in another aspect, the doorbell 14 can be configured with a display, and the exchange of bi-directional media streams can comprise outgoing video and audio streams from the system 12 (and the doorbell 18) to the device 28, and incoming video and audio streams from the device 28 to the system 12. The process can then proceed to decision step 136 in which the user 30 can choose to end the call at any time. If the user 30 does not end the call ("No"), the process can return to step 134 in which the base station 18 and the device 28 continue to exchange bi-directional media streams. In other words, the SIP session stays active until the user 30 ends the call via the device 28. However, if the user 30 does end the call ("Yes"), the process can return to the process 100 of FIG. 3 ("Call End"), returning to decision steps 102 and 104, monitoring for another trigger event.

However, returning to decision step 132 of FIG. 4 as well as the system diagram of FIG. 2, after accepting the call, the user 30 can also choose to communicate indirectly with the visitor 40. If the user 30 chooses to communicate indirectly with the visitor 40 ("No"), the process 130 can proceed instead to step 138 in which the microphone of the device 28 continues to be muted, and the device 28 proceeds to receive the synchronized media stream from the base station 18. Despite inhibiting audio from the device 28, the user 30 of the device 28 can still listen/view the media stream from the doorbell 14. In addition, at decision step 140, the user 30 can at any time decide whether to send a message to play at the doorbell 14. The user 30 can type or dictate a custom message, and/or select any of multiple predetermined messages, including messages pre-recorded by the user 30 and/or "stock" messages selectable by the user from a pre-programmed list, for playing to the speaker 54 of the doorbell 14. One exemplar message could be: "Please leave your package by the door." Another exemplar message could be: "Sorry I cannot come to the door right now. Please contact me later." If the user 30 decides to send a predetermined message ("Yes"), the process can proceed to step 142 in which the user 30 selects the message at the device 28 for the base station 18 to play at the doorbell 14. However, if the user 30 decides not to send a predetermined message ("No"), the process can bypass step 142 and proceed to decision step 144 for ending the call at any time. If the user 30 does not end the call ("No"), the process can return to step 138, continuing to receive at the device 28 the synchronized media stream from the base station 18, in a loop. In other words, the SIP session stays active until the user 30 ends the call via the device 28. In addition, during the call, the user 30 can continue to send messages to be played at the doorbell 14. Also, at any time during the call, the user 30 can unmute the microphone of the device 28 and start talking to the visitor, with an exchange of bi-directional media streams between the base station 18 and the device 28. However, if the user 30 does end the call ("Yes"), the process can return to the process 100 of FIG. 3 ("Call End"), returning to decision steps 102 and 104, monitoring for another trigger event.

Figure 5:
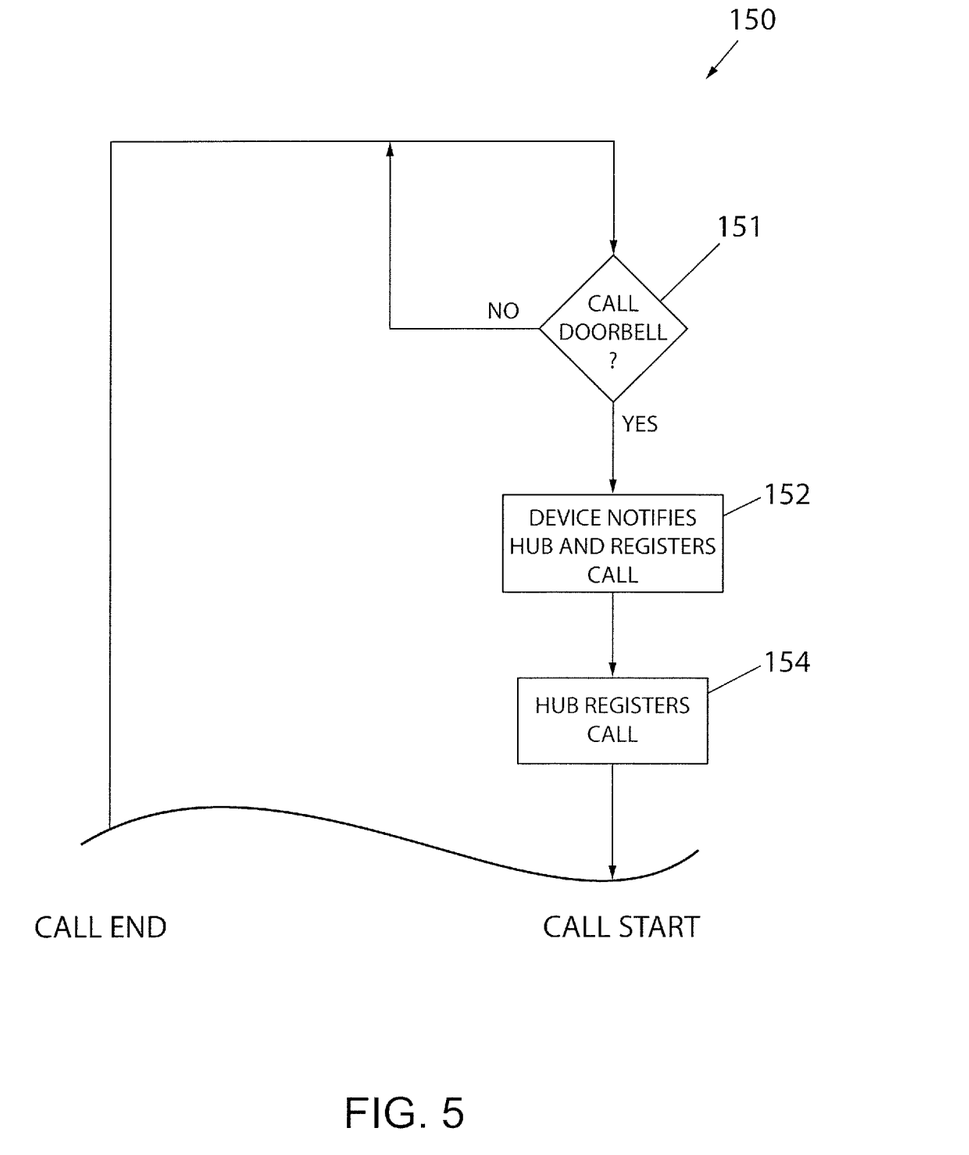
FIG. 5 is a flow chart illustrating operation for an electronic device making a call in the system of FIG. 1.

With additional reference FIGS. 2 and 5, in another aspect of the invention, the user 30 can control the device 28 to make a VoIP telephone call without waiting for a trigger event. Beginning at decision step 151, the user 30 can choose whether to call the doorbell 14 from the device 28. If the user 30 chooses not to call the doorbell 14 ("No"), the process 150 goes no further. However, if the user 30 does choose to call the doorbell 14 ("Yes"), the process 150 can proceed to step 152 in which the device 28 can register itself for a VoIP call and notify the base station 18. In particular, the device 28 can register for the call by contacting the call registration service 74 of the backend system 24. Also, the device 28 can notify the base station 18 to receive the call by contacting the system events service 70 of the backend system 24 which, in turn, contacts the event handler 58. At step 154, the base station 18 can register for the call by the event handler 58 contacting the call registration service 74. With the call registered at each endpoint, the call manager 82 of the device 28 can send a call invitation to the base station 18 through the signaling service 76. The call manager 64 of the base station 18, in turn, can receive the invite and automatically accept the call. With additional reference to FIG. 4, with the VoIP call connected, the process 150 can proceed to the telephone call routine ("Call Start") at process 130 as described above.

Figure 6:
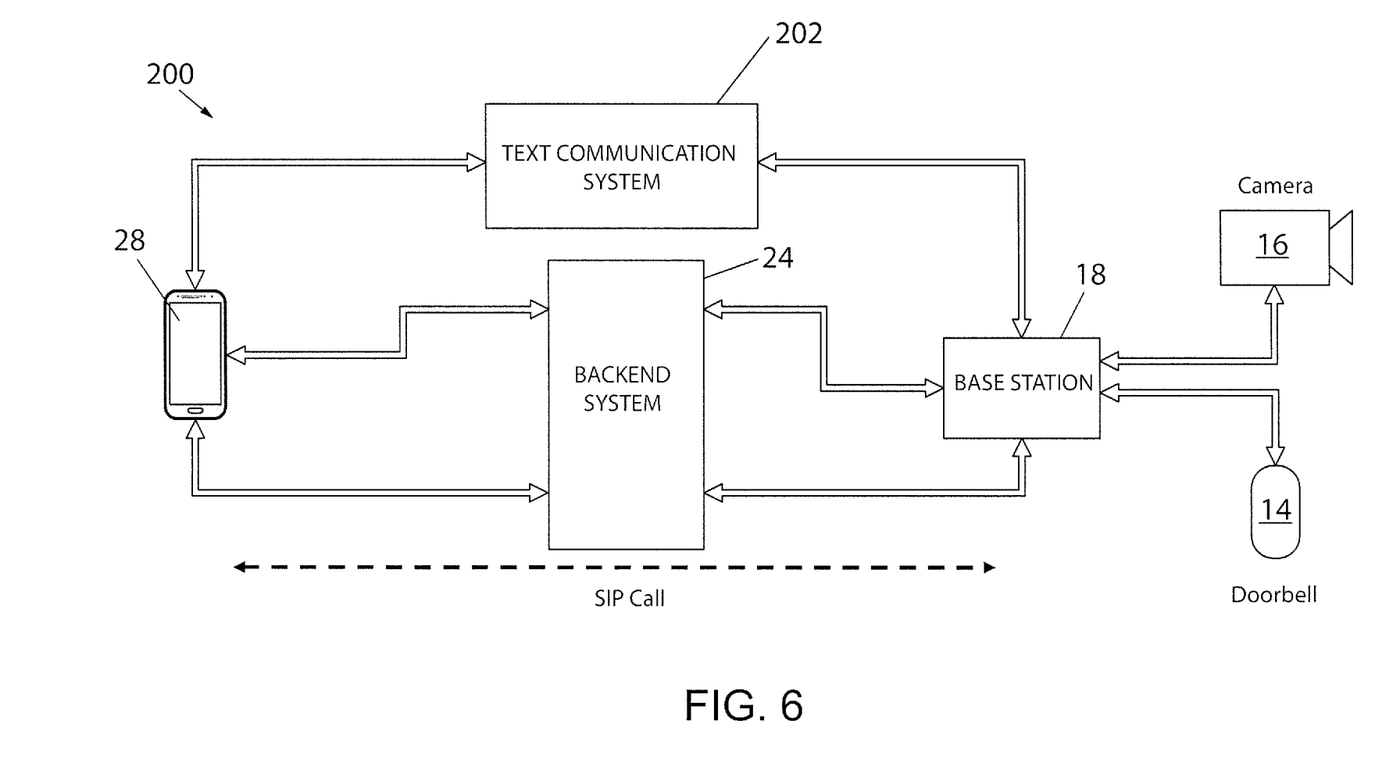
FIG. 6 is a diagram illustrating an exemplar system having a doorbell and a speech-to-text and/or a text-to-speech translation service for communicating remotely in real time in accordance with an aspect of the invention.

Referring now to FIG. 6, a diagram illustrating an exemplar system 200 having the doorbell 14 and a text communication system 202 is provided in accordance with an aspect of the invention. The text communication system 202 can provide bi-directional speech-to-text (STT) and/or text-to-speech (TTS) services for enabling remote communications between a visitor 40 and the user 30. In particular, the text communication system 202 can allow exchanging speech-to-text and/or text-to-speech messages between the doorbell 14 and the device 28 in real time, such as during a bi-directional, live Session Initiation Protocol (SIP) communication, enabled by the backend system 24, as discussed above.

In one aspect, the system 200 can detect a trigger event from the doorbell 14, such as at decision steps 102 and 104 as described above with respect to FIG. 3. After the trigger event, the base station 18 can receive an outgoing audio stream from the visitor 40, as captured by the microphone 52 of the doorbell 14. The base station 18 can then provide the outgoing audio stream to the text communication system 202 to provide a speech-to-text translation to produce an outgoing text message corresponding to the outgoing audio stream in a preferred language of the user 30. The base station 18 can direct the outgoing text message to the device 28 to be read by the user 30. In other words, audio captured by the visitor 40 at the doorbell 14 can be transcribed into text messages and sent to the user 30 of the device 28 using a speech-to-text service of the text communication system 202.

Similarly, the user 30 of the device 28 can type and send an incoming text message to the doorbell 14 for audio playback to the visitor 40. This might be done, for example, at times when the user 30 might not find it convenient to actually speak to the visitor 40 at the particular time of contact, but would it find it convenient to send text messages. The base station 18 can direct the incoming text message (from the device 28) to the text communication system 202 to provide a text-to-speech translation to produce an incoming audio stream corresponding to the incoming text message in a detected or predetermined language of the visitor 40. The base station 18 can then send the incoming audio stream to the speaker 54 of the doorbell 14 to be played for the visitor 40. In other words, the user 30 of the device 28 can send text messages to the doorbell 14 for playback to the visitor 40 by using a text-to-speech service of the text communication system 202. In one aspect, instead of the user typing a message, to produce the incoming text message the user could simply select a predetermined text message from among multiple predetermined text messages, such as "Please leave your package by the door." or "Sorry I cannot come to the door right now. Please contact me later." Such incoming/outgoing text messages can continue back and forth during a chat session so long as the communication path between the device 28 and the doorbell 14 remains open.

Figure 7:
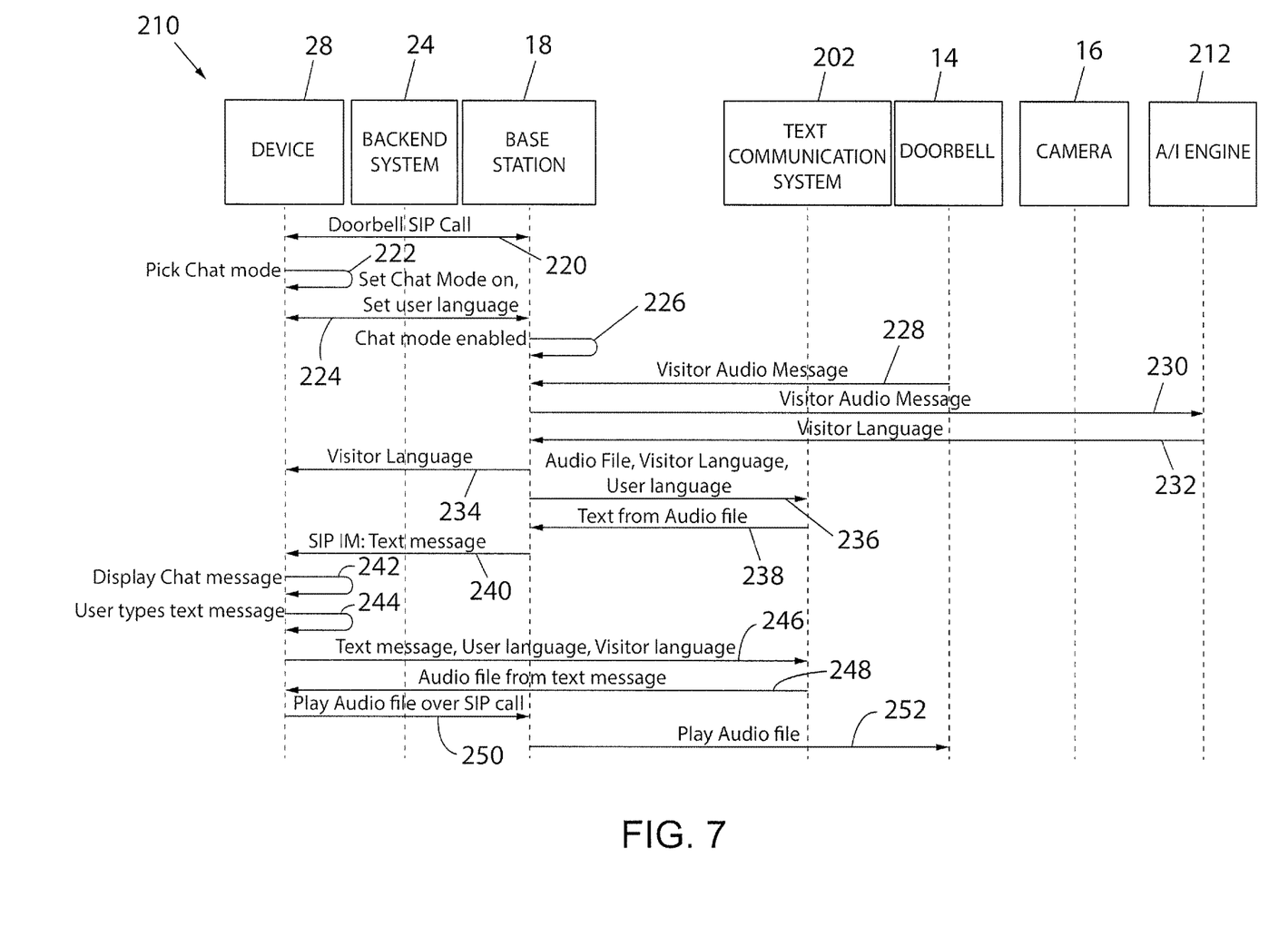
FIG. 7 is a timing diagram illustrating remote, real time communication in the system of FIG. 6 in accordance with an aspect of the invention.
Figure 8:
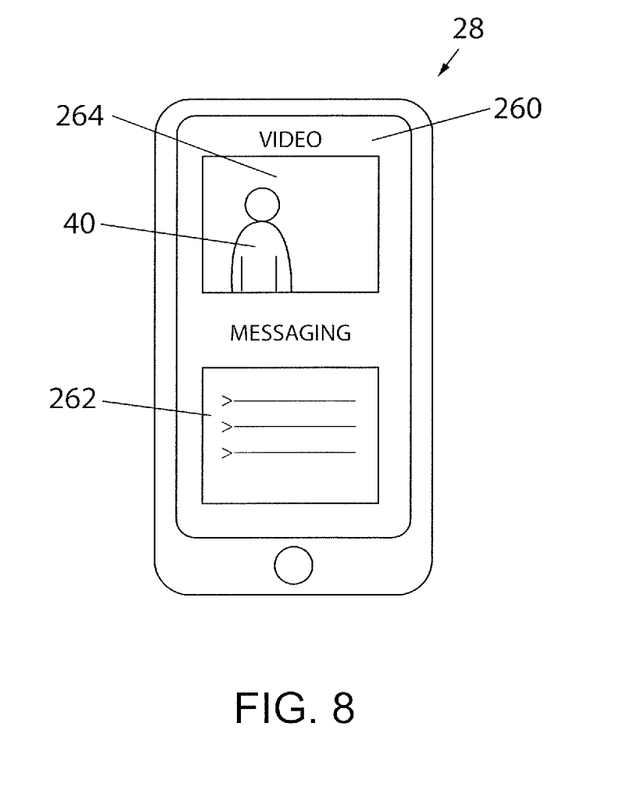
FIG. 8 is a diagram illustrating an exemplar computing device in which video of a visitor is displayed simultaneous with exchanging text messages with the visitor in accordance with an aspect of the invention.

With additional reference to FIG. 7, a timing diagram 230 illustrates exemplar communication in the system of FIG. 6 in accordance with an aspect of the invention. At step 220, the device 28 can register with the base station 18 for a call with the doorbell 14, such as during a SIP communication, including as described above with respect to FIGS. 1-5. Following such registration, at step 222, the user 30 can select chat as a mode for communicating with a visitor 40 at the doorbell 14. Such selection could be made, for example, through an application program 260 executing on the device 28 (see FIG. 8). At step 224, the user 30 can communicate through the device 28 to the base station 18 to activate the chat mode ("On"). In addition, the user 30 can indicate a predetermined language of the user 30 for communicating with visitors, such as English. In addition, the user 30 can indicate a predetermined gender and/or accent of the predetermined language chose, such as female with an Australian accent of English. At step 226, the base station 18 executes to activate the chat mode.

Next, at step 228, a trigger event can occur at the doorbell 14 with an outgoing audio message from the visitor 40 following the trigger event. At step 230, the outgoing audio message can be provided to an artificial intelligence system 212 operable to detect a language of the visitor 40, along with gender and/or accent. In one aspect, the artificial intelligence system 212 could comprise a neural network implemented by the base station 18. However, in another aspect, the artificial intelligence system 212 could be implemented by a remote system, such as server accessible through the WAN 26. At step 232, an indication of the language spoken by the visitor 40, along with gender and/or accent, as detected by the artificial intelligence system 212, is provided to the base station 18. At step 234, such indication of the language spoken by the visitor 40 is further provided from the base station 18 to the device 28.

Next, at step 236, the outgoing audio message from the visitor 40, the indication of the predetermined language of the user 30, and the indication of the language spoken by the visitor 40, are provided from the base station 18 to the text communication system 202. At step 238, a speech-to-text translation service of the text communication system 202 can produce and send an outgoing text message corresponding to the outgoing audio stream back to the base station 18. At step 240, the base station 18, in turn, can direct the outgoing text message to the device 28 during the SIP communication. At step 242, and with additional reference to FIG. 8, the outgoing text message can appear on the device 28 as an Instant Message (IM) or online chat 262 continuously updating through the application program 260. At step 244, the user 30 can type a text message, or select a predetermined text message as discussed above with respect to FIG. 6, to produce an incoming text message directed back to the visitor in the online chat 262.

At step 246, the incoming text message, the indication of the predetermined language of the user 30, and the indication of the language spoken by the visitor 40, can be provided from the device 28 back to the text communication system 202. At step 248, a text-to-speech translation service of the text communication system 202 can produce and send an incoming audio stream corresponding to the incoming text message back to the device 28. At step 250, the incoming audio stream can be sent by the device 28 to the base station 18 during the SIP communication. Then, at step 252, the base station 18 can send the incoming audio stream to the speaker 54 of the doorbell 14 to be played for the visitor 40. Such incoming/outgoing text and audio messages can continue back and forth during a chat session, continuously updating in the online chat 262, so long as the communication path between the device 28 and the doorbell 14 remains open. Accordingly, in addition to providing more convenient text communications between the user 30 and the visitor 40, the system 200 can further use artificial intelligence to detect the language, along with gender and/or accent, spoken by the visitor 40 for translating between a predetermined language of the user 30 and the language of the visitor 40.

Referring again to FIGS. 6 and 8, during such text communication, the system 200 can also utilize one or more cameras 16 for capturing a video stream 264 of the visitor 40 for display to the device 28. Such display of the video stream 264 can be live, simultaneous with the exchange of the aforementioned text messages between the user 30 and the visitor 40 in the online chat 262, together occurring in real time during the SIP communication.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic doorbell system, comprising:
    an electronic doorbell configured to capture an audio stream; and
    a hub in communication with the electronic doorbell, the hub having a processor executing a program stored in a non-transient medium operable to:
        detect a trigger event from the electronic doorbell,
        after the trigger event, receive an audio stream captured by the electronic doorbell, the audio stream being in a first language, and
        transmit the audio stream to a text communication system remote to the hub;
    at the text communication system, generate a message in a second language corresponding to the first language of the audio stream and
    direct the message in the second language from the text communication system to an electronic device.

2. The system of claim 1, further comprising the processor executing to detect the first language of the audio stream.

3. The system of claim 2, wherein the hub implements an artificial intelligence system operable to detect the first language.

4. The system of claim 3, wherein the artificial intelligence system comprises a neural network.

5. The system of claim 1, wherein the message is a text message produced by a speech-to-text translation service at the text communication system.

6. The system of claim 1, wherein the message is an outgoing text message, and further comprising the processor executing to receive an incoming text message from the electronic device.

7. The system of claim 6, wherein the audio stream is an outgoing audio stream, and further comprising the processor executing to produce an incoming audio stream corresponding to the incoming text message.

8. The system of claim 7, wherein the electronic doorbell comprises a microphone and a speaker, and further comprising the processor executing to capture the outgoing audio stream with the microphone and send the incoming audio stream to the speaker.

9. The system of claim 7, further comprising the processor executing to detect the first language and provide an indication of the language to a text-to-speech translation service at the text communication system.

10. The system of claim 9, wherein the incoming audio stream comprises a translation from the second language to the first language.

11. The system of claim 1, wherein the message is an outgoing text message, and further comprising the processor executing to receive an incoming text message from the electronic device, wherein the incoming text message is a predetermined text message selected from among a plurality of predetermined text messages.

12. A method for electronic communication, comprising:
    configuring an electronic doorbell to capture an audio stream;
    detecting a trigger event from the electronic doorbell;
    after the trigger event, receiving a message in the form of an audio stream captured by the electronic doorbell;
    detecting the language of the message;
    transmitting the message to a text communication system remote to the hub;
    at the text communication system, translating the message from the detected language to another language to produce a translated message; and transmitting the translated message from the text communication system to another device.

13. The method of claim 12, wherein the translated message is a text.

14. The method of claim 13, wherein the translated message is produced by transcribing the message using speech-to-text translation service at the text communication system to produce a text message corresponding to the audio stream.

\* \* \* \* \*